United States Patent
Tomoi et al.

(10) Patent No.: US 8,546,478 B2
(45) Date of Patent: Oct. 1, 2013

(54) THERMOPLASTIC ELASTOMER COMPOSITION AND METHOD FOR PRODUCING THE SAME

(75) Inventors: Shusaku Tomoi, Hiratsuka (JP); Kouichi Kawaguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/392,724

(22) PCT Filed: Mar. 18, 2011

(86) PCT No.: PCT/JP2011/057495
§ 371 (c)(1),
(2), (4) Date: Feb. 27, 2012

(87) PCT Pub. No.: WO2011/148708
PCT Pub. Date: Dec. 1, 2011

(65) Prior Publication Data
US 2013/0056123 A1 Mar. 7, 2013

(30) Foreign Application Priority Data

May 27, 2010 (JP) ................................. 2010-121903

(51) Int. Cl.
C08L 77/00 (2006.01)
C08L 33/08 (2006.01)
C08L 29/06 (2006.01)
C08L 23/30 (2006.01)
C08L 25/18 (2006.01)
B60C 5/14 (2006.01)

(52) U.S. Cl.
USPC ............................ 524/519; 524/503; 152/510

(58) Field of Classification Search
USPC ................... 524/519, 503; 152/510
See application file for complete search history.

(56) References Cited

U.S. PATENT DOCUMENTS

| | | | |
|---|---|---|---|
| 5,681,899 A * | 10/1997 | Wang et al. | 525/232 |
| 6,079,465 A | 6/2000 | Takeyama et al. | |
| 2009/0068476 A1 | 3/2009 | Kirino | |
| 2009/0288749 A1 | 11/2009 | Tomoi | |
| 2010/0071823 A1 | 3/2010 | Tomoi | |

FOREIGN PATENT DOCUMENTS

| | | |
|---|---|---|
| CN | 101171146 A | 4/2008 |
| EP | 0722850 A1 | 7/1996 |
| JP | 8-217922 A | 8/1996 |
| JP | 08216610 A | 8/1996 |
| JP | 2001-512167 A | 8/2001 |
| JP | 2009-298986 A | 12/2009 |
| WO | WO-99/06480 A1 | 2/1999 |
| WO | WO-2007/116983 A1 | 10/2007 |
| WO | WO-2008/096900 A1 | 8/2008 |

OTHER PUBLICATIONS

International Search Report and Written Opinion for Application No. PCT/JP2011/057495 mailed May 14, 2011.
Office Action dated May 22, 2013 issued in connection with Chinese counterpart Application No. 201180004167.x.

* cited by examiner

*Primary Examiner* — William Cheung
(74) *Attorney, Agent, or Firm* — Novak Druce Connolly Bove + Quigg LLP

(57) ABSTRACT

Disclosed is a method for producing a thermoplastic elastomer composition having a phase structure comprising a continuous phase comprising at least one thermoplastic resin and a disperse phase comprising dynamically crosslinked elastomer particles finely dispersed in the continuous phase, the method being characterized by dispersing in at least one crosslinkable elastomer component furnace carbon black having a BET nitrogen adsorption specific surface area of from 100 to 260 m$^2$/g and a primary particle average particle diameter of from 10 to 25 nm in an amount of 1 to 15 parts by weight with respect to 100 parts by weight of the at least one crosslinkable elastomer component, prior to or during dynamic crosslinking.

20 Claims, No Drawings

THERMOPLASTIC ELASTOMER COMPOSITION AND METHOD FOR PRODUCING THE SAME

CROSS REFERENCE TO RELATED APPLICATIONS

This application is a National Phase filing under 35 U.S.C. §371 of PCT/JP2011/057495 filed on Mar. 18, 2011; and this application claims priority to Application No. 2010-121903 filed in Japan on May 27, 2010 under 35 U.S.C. §119; the entire contents of all are hereby incorporated by reference.

TECHNICAL FIELD

The present invention relates to a thermoplastic elastomer composition and a method for producing the same, and more specifically, it relates to a thermoplastic elastomer composition having excellent ultraviolet radiation degradation resistance (UV degradation resistance) and durability, a method for producing the same, and a pneumatic tire in which the thermoplastic elastomer composition is used as an air permeation preventing layer (innerliner).

BACKGROUND ART

Reducing tire weight by disposing a layer of a thermoplastic elastomer composition which is obtained by melt-kneading a thermoplastic resin and an unvulcanized (uncrosslinked) elastomer component to dynamically vulcanize the elastomer component, on a tire inner surface as an air permeation preventing layer (see, for example, Japanese Unexamined Patent Publication (JP-A) Nos. 8-216610 and 8-217922) has been proposed. However, there is a problem that, when a tire having on the inner surface thereof a layer of a thermoplastic elastomer composition that has been left outdoors and is exposed to sunlight, the layer of the thermoplastic elastomer composition will degrade due to UV radiation. In addition, although it is known that adding carbon black to a rubber composition makes the rubber composition less likely to degrade due to ultraviolet radiation (see Japanese Unexamined Patent Publication (JP-A) No. 2001-512167), there is a problem that, if carbon black is simply melt-kneaded with a thermoplastic resin and an unvulcanized elastomer component, carbon black can cause defects, and thereby reduce the durability of the composition.

PRIOR ART DOCUMENTS

Patent Documents

Patent Document 1:
Japanese Unexamined Patent Publication No. 8-216610
Patent Document 2:
Japanese Unexamined Patent Publication No. 8-217922
Patent Document 3:
Japanese Unexamined Patent Publication No. 2001-512167

SUMMARY OF THE INVENTION

Problems to be Solved by the Invention

Accordingly, the object of the present invention is to provide a method for producing a thermoplastic elastomer composition which is excellent in both UV degradation resistance and durability.

Means to Solve the Problems

The inventors have found that, in a method for producing a thermoplastic elastomer composition having a phase structure comprising a continuous phase comprising a thermoplastic resin and a disperse phase comprising a crosslinked elastomer component, dispersing a specific amount of a specific carbon black in at least one crosslinkable elastomer component prior to or during dynamic crosslinking significantly improves UV degradation resistance without diminishing the durability, the present invention has been completed.

According to the present invention, a method for producing a thermoplastic elastomer composition having a phase structure comprising a continuous phase comprising at least one thermoplastic resin and a disperse phase comprising dynamically crosslinked elastomer particles finely dispersed in the continuous phase is provided, the method being characterized by dispersing in at least one crosslinkable elastomer component furnace carbon black (hereinafter referred to as "medium color furnace carbon black") having a BET nitrogen adsorption specific surface area of from 100 to 260 $m^2/g$ and a primary particle average particle diameter of from 10 to 25 nm in an amount of 1 to 15 parts by weight with respect to 100 parts by weight of the at least one crosslinkable elastomer component, prior to or during dynamic crosslinking.

According to the present invention, a pneumatic tire comprising an air permeation preventing layer disposed on the inner surface of the tire is further provided, wherein the air permeation preventing layer is comprised of the thermoplastic elastomer composition prepared by the above method.

MODE FOR CARRYING OUT THE INVENTION

Examples of the thermoplastic resin which can be used in the method for producing the thermoplastic elastomer composition of the present invention include polyamide-based resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6, Nylon 6T, Nylon 6/6T copolymer, Nylon 66/PP copolymer, and Nylon 66/PPS copolymer), polyester-based resins (for example, aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethyleneglycol copolymer, polyoxyalkylenediimide diacid/polybutylene terephthalate copolymer, and the like), polynitrile-based resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), poly(meth)acrylate-based resins (for example, poly(methyl methacrylate) (PMMA), polyethyl methacrylate)), polyvinyl-based resins (for example, vinyl acetate, poly(vinyl alcohol) (PVA), vinyl alcohol/ethylene copolymer (EVOH), poly(vinylidene chloride) (PVDC), poly(vinyl chloride) (PVC), vinyl chloride/vinylidene chloride copolymer, and vinylidene chloride/methyl acrylate copolymer), cellulosic resins (for example, cellulose acetate and cellulose acetate butylate), fluororesins (for example, poly(vinylidene fluoride) (PVDF), poly(vinyl fluoride) (PVF), polychlorofluoroethylene (PCTFE), tetrafluoroethylene/ethylene copolymer (ETFE), imide-based resins (for example aromatic polyimides (PI)), and the like. The continuous phase may be comprised of one or more of these thermoplastic resins. In view of gas barrier properties, mechanical properties, etc., polyamide-based resins, poly(vinyl alcohol) and ethylene-vinyl alcohol copolymer are preferred as the thermoplastic resin. In addition, in view of the balance between the gas barrier properties and the mechanical properties, Nylon 6, Nylon 66, Nylon 6/66 copolymer, Nylon 11, Nylon 12, and Nylon MXD6 are preferred as the polyamide-based resins.

Examples of the crosslinkable elastomer component include diene-based rubbers and hydrogenation products thereof (for example, natural rubber (NR), isoprene rubber (IR), epoxidized natural rubber, styrene-butadiene rubber (SBR), butadiene rubber (BR) (high-cis BR and low-cis BR), nitrile rubber (NBR), hydrogenated NBR, hydrogenated SBR), olefin-based rubbers (for example, ethylene-propylene rubber (EPDM, EPM), maleic acid-modified ethylene-propylene rubber (M-EPM), maleic acid-modified ethylene-alpha-olefin copolymer, butyl rubber (IIR), copolymers of isobutylene and an aromatic vinyl or diene monomer), acrylic rubbers (ACM), halogen-containing rubbers (for example, bromobutyl rubber (Br-IIR), chlorobutyl rubber (Cl-IIR), brominated isobutylene-paramethylstyrene copolymer (Br-IPMS), chloroprene rubber (CR), hydrin rubber (CHR.CHC); chlorosulfonated polyethylene (CSM), chlorinated polyethylene (CM), maleic acid-modified chlorinated polyethylene (M-CM)), silicone rubbers (for example, methylvinylsilicone rubber, dimethylsilicone rubber, methylphenylvinylsilicone rubber), sulfur-containing rubbers (for example, polysulfide rubber), fluororubbers (for example, vinylidene fluoride-based rubbers, fluorine-containing vinylether-based rubbers, tetrafluoroethylene-propylene-based rubbers, fluorine-containing silicone rubbers, fluorine-containing phosphazene-based rubbers), thermoplastic elastomers (for example, styrene-based elastomers, olefin-based elastomers, and polyamide-based elastomers), etc. The crosslikable elastomer component may be comprised of one or more of these elastomer components. In view of thermal stability, dispersibility into the used thermoplastic resin, etc., halobutyl rubbers, halogenated isobutylene-paramethylstyrene copolymer, and maleic acid modified ethylene-alpha-olefin copolymer are preferred as the crosslinkable elastomer component.

In the method for producing a thermoplastic elastomer composition of the present invention, the amount of the crosslinkable elastomer component is preferably from 100 to 250 parts by weight with respect to 100 parts by weight of the thermoplastic resin. When a thermoplastic elastomer composition in which the total amount of the crosslinkable elastomer component is less than 100 parts by weight with respect to 100 parts by weight of the thermoplastic resin is used as a tire innerliner, there is a concern that it exhibits a reduced fatigue durability, while if the total amount of the crosslinkable elastomer component is more that 250 parts by weight, there is a concern that the desired thermoplastic elastomer composition cannot be obtained due to the phase inversion between the thermoplastic resin phase which being a continuous phase and the rubber phase which being a dispersed phase.

In the thermoplastic elastomer composition produced by the method of the present invention, it is conceivable that the medium color furnace carbon black exerts a strong effect as an UV degradation inhibitor and imparts the thermoplastic elastomer composition with strong UV degradation resistance, since the medium color furnace carbon black is dispersed in the crosslinked elastomer particles, and moreover, the crosslinked elastomer particles are finely dispersed in the thermoplastic resin which being a continuous phase. The medium color furnace carbon black (hereinafter referred to also as "MCF") used in the present invention refers to a medium grade carbon black produced by a furnace process, among color carbon blacks conventionally used as a black pigment in printing inks, paints, etc. The medium color furnace carbon black used in the present invention preferably has a BET nitrogen adsorption specific surface area of from 100 to 260 $m^2/g$ and a primary particle average particle diameter of from 10 to 25 nm, where the term "primary particle" means the smallest unit of particles which cannot be subdivided. The carbon blacks that are smaller than the primary particle average particle diameter of the above range are susceptible to diffusion in the form of dust, and therefore are difficult to be handled and exhibits a low kneading processability with the crosslinkable elastomer component and others. In addition, in the same amount (weight basis), the larger the average particle diameter of carbon black, the lower the dispersibility of carbon black is and the higher the tendency of the carbon black to act as defects, and therefore carbon blacks larger than the above range of the primary particle average particle diameter are not preferred. In order to enable both durability and UV resistance in the thermoplastic elastomer composition of the present invention, it is important that the carbon black is present as fine particles in the rubber particles that are finely dispersed in the thermoplastic resin. When a granulated carbon black is to be used, a process for breaking down the granulated state of the carbon black is needed. Therefore, it is preferred that the medium color furnace carbon black is ungranulated.

The amount of the medium color furnace carbon black is 1 to 15 parts by weight with respect to 100 parts by weight of the total amount of the elastomer component. An amount of the medium color furnace carbon black of less than 1 part by weight with respect to 100 parts by weight of the elastomer component is insufficient to improve the UV degradation resistance of the thermoplastic elastomer composition, and when the amount of the medium color furnace carbon black is more than 15 parts by weight with respect to 100 parts by weight of the total elastomer component, the effects of the carbon black as a foreign substance (defects) become larger, and thereby the thermoplastic elastomer composition tends to decrease its durability.

The type and amount of the crosslinking agent which can be used in the production of the thermoplastic elastomer composition of the present invention can be determined by a person with ordinary skill in the art depending on the type of the crosslinkable elastomer component and the dynamic crosslinking conditions. The specific examples of the crosslinking agent include zinc oxide, stearic acid, zinc stearate, sulfur, organic peroxide crosslinking agents, and 3,3'-diaminodiphenylsulfone. The amount of the crosslinking agent is typically 0.1 to 10 parts by weight with respect to 100 parts by weight of the crosslinkable elastomer component.

Moreover, in addition to the essential components, optional additives such as compatibilizers, antioxidants, vulcanization accelerators, vulcanization retarders, plasticizers, fillers, coloring agents, and processing aids, may be blended to the thermoplastic elastomer composition, as necessary, as long as the object of the present invention is not diminished.

The kneading and dynamic crosslinking of the essential components (i.e., at least one thermoplastic resin, at least one crosslinkable elastomer component, the medium color furnace carbon black, and a crosslinking agent) and optional additives may be carried out in the same equipment in a continuous manner, or the kneading and dynamic crosslinking may be carried out separately from each other using two or more equipments. The term "dynamic crosslinking" as used herein means a process in which a crosslinkable elastomer component is blended to the matrix of a thermoplastic resin, melt-kneading them along with a crosslinking agent at or higher than the temperature at which the crosslinking agent initiates crosslinking. In the composition obtained by this dynamic crosslinking, the crosslinked elastomer particles are finely dispersed in the thermoplastic resin which forms a continuous phase, and thereby allow the composition to be processed in a molding process as in thermoplastic resins.

In the thermoplastic elastomer composition obtained by the above production method according to the present invention, the continuous phase and the disperse phase comprised of the crosslinked elastomer particles that are finely dispersed in the continuous phase form an so called islands-in-sea structure, and the crosslinked elastomer particles are finely dispersed in the continuous phase (sea phase) of the thermoplastic resin in the form of discontinuous islands. The crosslinked elastomer particles preferably have an average particle diameter of about 0.1 to 5 µm. When the crosslinked elastomer particles have an average particle diameter within this range, a thermoplastic elastomer composition which is excellent in fatigue durability and other properties can be obtained.

Examples of the kneading machines that can be used in kneading the above essential components and any optional additives include, but are not limited to, kneader, Banbury mixer, twin-screw kneading extruder, and the like. Among these kneading machines, a twin-screw kneading extruder is preferably used, because it is possible to carry out the kneading and dynamic crosslinking of the thermoplastic resin and the crosslinkable elastomer component and the medium color furnace carbon black in the same equipment.

In the production method of the thermoplastic elastomer composition according to the present invention, dispersing the medium color furnace carbon black into at least one crosslinkable elastomer component prior to or during dynamic crosslinking can be attained by (I) (a) kneading at least one crosslinkable elastomer composition and the medium color furnace carbon black to form a premix in which the medium color furnace carbon black is dispersed in the crosslinkable elastomer component, or (b) kneading at least one crosslinkable elastomer component, the medium color furnace carbon black, and a crosslinking agent to form a premix in which the medium color furnace carbon black and the crosslinking agent are dispersed in the crosslinkable elastomer, (II) adding at least one thermoplastic resin to the premix, and (III) dynamically crosslinking the crosslinkable elastomer component while melt-kneading the premix and the thermoplastic resin.

In step (I), if at least one crosslinkable elastomer component and the medium color furnace carbon black are kneaded to form a premix in which the medium color furnace carbon black is dispersed in the crosslinkable elastomer component (in the case of (a)), the crosslinking agent can be added to the premix at any time before the crosslinkable elastomer component is cross linked.

The essential components and optional additives may be added in any order, provided that the medium color furnace carbon black is added to and kneaded with the crosslinkable elastomer component simultaneously with or before the addition of the thermoplastic resin to the crosslinkable elastomer component. However, it is preferred that the medium color furnace carbon black is kneaded with the crosslinkable elastomer component before the thermoplastic resin. Kneading the medium color furnace carbon black with the crosslinkable elastomer component before the thermoplastic resin allows the medium color furnace carbon black to present selectively in the crosslinkable elastomer component until the dynamic crosslinking of the crosslinkable elastomer component is completed, and thereby minimizing the defects due to the carbon black in the thermoplastic resin. Optional additives may be premixed with one or more of the essential components, or may be added to the premix of two or more of the essential components during the kneading prior to the dynamic crosslinking of the crosslinkable elastomer component or during the dynamic crosslinking of the crosslinkable elastomer component.

Prior to the dynamic crosslinking by a twin-screw kneading extruder, at least one crosslinkable elastomer component and the medium color furnace carbon black, or at least one crosslinkable elastomer component, the medium color furnace carbon black, and a crosslinking agent, may be kneaded by a Banbury mixer or kneader to form a premix in which the medium color furnace carbon black is dispersed in the crosslinkable elastomer component or a premix in which the medium color furnace carbon black and the crosslinking agent are dispersed in the crosslinkable elastomer component, and subsequently at least one thermoplastic resin may be fed to the twin-screw kneading extruder along with the premix to carry out dynamic crosslinking. The premix is preferably shaped into the form of a pellet, granule, etc., before it is fed to a twin-screw kneading extruder so that the premix is promptly mixed with and dispersed in at least one thermoplastic resin in the extruder. In addition, to increase the dispersion degree of the medium color furnace carbon black into the crosslinkable elastomer component, it is preferable that the crosslinkable elastomer component and the medium color furnace carbon black are preliminary kneaded. The kneading conditions and the dynamic crosslinking conditions depend on the types and amounts of the thermoplastic resin, crosslinkable elastomer component and crosslinking agent used. However, generally, kneading with a Banbury mixer or kneader is carried out at a temperature of about 50° C. to about 100° C. for about 2 minutes to about 5 minutes, and dynamic crosslinking is carried out at a temperature (usually, about 160° C. to about 300° C.) which is equal to or higher than the temperature at which the rubber can be crosslinked and which is equal to or higher than the melting temperature of the thermoplastic resin for about 30 seconds to about 5 minutes (residence time).

If kneading and dynamic crosslinking of the essential components and optional additives are carried out by using a twin-screw kneading extruder without a Banbury mixer or kneader separately from the twin-screw kneading extruder, the twin-screw kneading extruder has at least a kneading zone, and a dynamic crosslinking zone which is provided at the downstream side in the extrusion direction with respect to the kneading zone. At the upstream side with respect to the dynamic crosslinking zone, (i) at least one thermoplastic resin, at least one crosslinkable elastomer component, the medium color furnace carbon black, and a crosslinking agent, or (ii) the premix of at least one crosslinkable elastomer component, the medium color furnace carbon black, and a crosslinking agent, as well as at least one thermoplastic resin, are fed to the twin-screw kneading extruder. The kneading conditions and the dynamic crosslinking conditions in this case depend on the types and amounts of the thermoplastic resin, crosslinkable elastomer component and crosslinking agent used. However, generally, kneading in the mixing zone is carried out at a temperature of about 50° C. to about 100° C. for a residence time of about 1 minute to about 3 minutes, and the dynamic crosslinking in the dynamic crosslinking zone is carried out at a temperature (usually, about 160° C. to about 300° C.) which is equal to or higher than the temperature at which the rubber can be crosslinked and is equal to or higher than the melting temperature of the thermoplastic resin for a residence time of from about 30 seconds to about 5 minutes.

The thermoplastic elastomer composition obtained by the above method may be extruded in molten state from the die attached to the outlet port of the twin-screw kneading extruder using a conventional method into a shape such as a film, sheet, or tube form, or may be extruded into the form of strand and pelletized with a resin pelletizer, and subsequently the resulting pellets are formed into a film, sheet, or tube form using a conventional resin forming method such as inflation forming, calendar forming, extrusion forming, etc.

An example of the method for producing a pneumatic tire comprising an air permeation preventing layer which is comprised of the thermoplastic elastomer composition of the present invention, wherein the air permeation preventing layer, is disposed on the inner side of the carcass layer is as follows: forming the thermoplastic elastomer composition into a film having a predetermined width and thickness, laminating the resulting film on a tire molding drum in cylindrical form, sequentially laminating thereon tire members such as a carcass layer, a belt layer, a tread layer, etc., and removing the resulting green tire from the tire molding drum. Then, the resulting green tire is vulcanized in accordance with a conventional procedure to produce a desired pneumatic tire comprising an air permeation preventing layer disposed on the inner surface of the tire, wherein the air permeation preventing layer is comprised of the thermoplastic elastomer composition of the present invention. Using the thermoplastic elastomer composition produced by the method of the present invention as an air permeation preventing layer of a pneumatic tire prevents the tire from degrading when it is exposed to sunlight during storage or during unused conditions, thereby making it possible to improve the durability of the pneumatic tire.

EXAMPLES

The present invention will be further explained with reference to the following examples. However, it should be understood that the scope of the present invention is not limited by these examples.

Preparation of Thermoplastic Elastomer Composition

Example 1

A crosslinkable elastomer component, a carbon black, and crosslinking agents (zinc oxide, stearic acid, and zinc stearate) in the amounts (in parts by weight) shown in Table 1, were charged in a closed-type Banbury mixer (manufactured by Kobe Steel Ltd.) and were mixed together at 100° C. for 2 minutes to prepare a premix. The resulting premix was pelletized by a rubber pelletizer (manufactured by Moriyama Co., Ltd.). Kneading and dynamic crosslinking were carried out on the pelletized premix and the thermoplastic resin and modified polyolefin in the amounts (in parts by weight) shown in Table 1 using a twin-screw kneading extruder (manufactured by The Japan Steel Works, Ltd.). The pelletized premix as well as Nylon 6/66 copolymer and maleic acid-modified ethylene-ethyl acrylate copolymer as thermoplastic resins were charged into the cylinder of the twin-screw kneading extruder through the starting material feeding port of the extruder, and were melt-kneaded at a dynamic crosslinking zone set at a temperature of 250° C. and a residence time of 3 minutes to dynamically crosslink the crosslinkable elastomer component, and the resulting melt-kneaded mixture was extruded from the die attached to the outlet port of the twin-screw kneading extruder into a strand form. The resulting extrudate in the form of strand was pelletized by a resin pelletizer to obtain pellets of a thermoplastic elastomer composition.

Example 2

A crosslinkable elastomer component, a carbon black, and crosslinking agents (zinc oxide, stearic acid, and zinc stearate) in the amounts (in parts by weight) shown in Table 1, were mixed by a pressurizing-type kneader (manufactured by Moriyama Co.) at 100° C. for 2 minutes to prepare a premix. The resulting premix was pelletized by a rubber pelletizer as in Example 1, and the pelletized premix and the thermoplastic resins in the amounts (in parts by weight) shown in Table 1 were processed by a twin-screw kneading extruder as in Example 1, and were pelletized to obtain pellets of a thermoplastic elastomer composition.

Example 3

This example illustrates the preparation of a thermoplastic elastomer composition by using a twin-screw kneading extruder (manufactured by The Japan Steel Works, Ltd.) having a first starting material inlet port provided at the screw root section; a kneading zone and a dynamically crosslinking zone that were provided in this order at the downstream side in the extrusion direction with respect to the first raw material inlet port; a second starting material inlet port provided between the kneading zone and the dynamically crosslinking zone; and an outlet port. A crosslinkable elastomer component, a carbon black, and crosslinking agents (zinc oxide, stearic acid, and zinc stearate) in the amounts (parts by weight) shown in Table 1 were charged into the cylinder of the twin-screw kneading extruder through the first starting material inlet port, and were conveyed through the kneading zone set at a temperature of 100° C. and a residence time of one minute to knead them, thereby dispersing the carbon black and the crosslinking agents in the crosslinkable elastomer component, and a thermoplastic resin was charged in the cylinder of the extruder through the second starting material inlet port, and the crosslinkable elastomer component was dynamically crosslinked by melt-kneading in the dynamically crosslinking zone set at a temperature of 250° C. and a residence time of 2 minutes, and the melt-kneaded mixture was extruded from the die attached to the outlet port of the twin-screw kneading extruder into a strand form. The resulting extrudate in the form of a strand was pelletized by a resin pelletizer to obtain pellets of a thermoplastic elastomer composition.

Examples 4 and 5

A crosslinkable elastomer component, a carbon black, and crosslinking agents (zinc oxide, stearic acid, and zinc stearate) in the amounts (in parts by weight) shown in Table 1 were charged in a closed-type Banbury mixer (manufactured by Kobe Steel Ltd.) and were mixed together at 100° C. for 2 minutes to prepare a premix, as in Example 1. The resulting premix was pelletized by a rubber pelletizer as in Example 1, and the resulting pelletized premix and the thermoplastic resins in the amounts shown in Table 1 were processed by a twin-screw kneading extruder as in Example 1, and pelletized to obtain pellets of a thermoplastic elastomer composition.

Example 6

Pellets of a thermoplastic elastomer composition were obtained as in Example 3, except that the carbon black was charged in the cylinder from the second starting material inlet port.

Comparative Example 1

This example illustrates the preparation of a thermoplastic elastomer composition by using a twin-screw kneading extruder (manufactured by The Japan Steel Works, Ltd.) having a first starting material inlet port provided at the screw root section; a kneading zone, a dynamically crosslinking zone, and a second kneading zone that were provided at the downstream side in the extrusion direction with respect to the first starting material inlet port; a second starting material inlet port provided between the kneading zone and the dynamically crosslinking zone; a third starting material inlet port provided between the dynamically crosslinking zone and the second kneading zone; and an outlet port. A crosslinkable elastomer component and crosslinking agents (zinc oxide, stearic acid, and zinc stearate) in the amounts (in parts by weight) shown in Table 1 were charged into the cylinder of the twin-screw kneading extruder through the first starting material inlet port, and were conveyed through the kneading zone set at a temperature of 100° C. and a residence time of one minute, and the thermoplastic resins were charged in the cylinder of the extruder through the second starting material inlet port, and the crosslinkable elastomer component was dynamically crosslinked by melt-kneading at the dynamically crosslinking zone set at a temperature of 250° C. and a residence time of 2 minutes, and subsequently a carbon black was charged in the cylinder through the third starting material inlet port, and melt-kneading was continued in the second kneading zone set at a temperature of 250° C. and a residence time of one minute, and the resulting melt-kneaded mixture was extruded from the die attached to the outlet port of the twin-screw kneading extruder into a strand form. The resulting extrudate in the form of a strand was pelletized by a resin pelletizer to obtain pellets of a thermoplastic elastomer composition.

Comparative Examples 2 to 6

A crosslinkable elastomer component, a carbon black, and crosslinking agents (zinc oxide, stearic acid, and zinc stearate) in the amounts (in parts by weight) shown in Table 1 were charged into a closed-type Banbury mixer (manufactured by Kobe Steel Ltd.) and were mixed together at 100° C. for 2 minutes to prepare a premix, as in Example 1. The resulting premix was pelletized by a rubber pelletizer as in Example 1, and the resulting pelletized premix and the thermoplastic resins in the amount shown in Table 1 were processed by a twin-screw kneading extruder as in Example 1, and pelletized to obtain pellets of a thermoplastic elastomer composition.

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Starting Materials | | | | | | | | | | | | |
| Elastomer component 1[1] | 100.0 | 100.0 | 100.0 | 100.0 | 100.0 | 100.0 | 100.0 | 100.0 | 100.0 | 100.0 | 100.0 | 100.0 |
| Carbon black (MCF)[2] | 5.0 | 5.0 | 5.0 | 1.0 | 15.0 | 5.0 | 5.0 | 0.5 | 20.0 | — | — | — |
| Carbon black (GPF)[3] | — | — | — | — | — | — | — | — | — | 5.0 | — | — |
| Carbon black (HAF)[4] | — | — | — | — | — | — | — | — | — | — | 5.0 | — |
| Carbon black (HCF)[5] | — | — | — | — | — | — | — | — | — | — | — | 5.0 |
| Thermoplastic resin 1[6] | 80.0 | 80.0 | 80.0 | 80.0 | 80.0 | 80.0 | 80.0 | 80.0 | 80.0 | 80.0 | 80.0 | 80.0 |
| Thermoplastic resin 2[7] | 10.0 | 10.0 | 10.0 | 10.0 | 10.0 | 10.0 | 10.0 | 10.0 | 10.0 | 10.0 | 10.0 | 10.0 |
| Zinc oxide[8] | 0.5 | 0.5 | 0.5 | 0.5 | 0.5 | 0.5 | 0.5 | 0.5 | 0.5 | 0.5 | 0.5 | 0.5 |
| Stearic acid[9] | 1.0 | 1.0 | 1.0 | 1.0 | 1.0 | 1.0 | 1.0 | 1.0 | 1.0 | 1.0 | 1.0 | 1.0 |
| Zinc stearate[10] | 0.5 | 0.5 | 0.5 | 0.5 | 0.5 | 0.5 | 0.5 | 0.5 | 0.5 | 0.5 | 0.5 | 0.5 |
| Carbon black blending step | Before cross-linking | Before cross-linking | Before cross-linking | Before cross-linking | Before cross-linking | Before cross-linking | After cross-linking | Before cross-linking | Before cross-linking | Before cross-linking | Before cross-linking | Before Cross-linking |
| Test Results | | | | | | | | | | | | |
| Accelerated indoor exposure test | Passed | Passed | Passed | Passed | Passed | Passed | Passed | Failed | Passed | Failed | Passed | Passed |
| Tire durability test | Passed | Passed | Passed | Passed | Passed | Passed | Failed | Failed | Failed | Failed | Failed | Failed |

Footnote of Table 1:
[1] Brominated isobutylene-paramethylstyrene copolymer (Exxpro MDX89-4 manufactured by ExxonMobile Chemical Company)
[2] MA600 (MCF grade) (BET nitrogen adsorption specific surface area: 140 $m^2/g$, primary particle average particle diameter: 20 nm) manufactured by Mitsubishi Chemical Co., Ltd.
[3] Seast V (GPF grade) (BET nitrogen adsorption specific surface area: 62 $m^2/g$, primary particle average particle diameter: 27 nm) manufactured by Tokai Carbon Co., Ltd.
[4] Seast 3 (HAF grade) (BET nitrogen adsorption specific surface area: 79 $m^2/g$, primary particle average particle diameter: 28 nm) manufactured by Tokai Carbon Co., Ltd.
[5] #2300 (HCF grade) (BET nitrogen adsorption specific surface area: 320 $m^2/g$, primary particle average particle diameter: 15 nm) manufactured by Mitsubishi Chemical Co., Ltd.
[6] Nylon 6/66 copolymer (5013B manufactured by Ube Industries, Ltd.)
[7] Maleic acid-modified ethylene-ethyl acrylate copolymer (HPR AR201 manufactured by Mitsui-DuPont Polychemical Co., Ltd.)
[8] Zinc oxide of JIS grade 3 manufactured by Seido Chemical Industry Co., Ltd.
[9] Beads Stearic Acid manufactured by Nippon Oil & Fat Co., Ltd.
[10] Manufactured by Sakai Chemical Co., Ltd.
*Regarding the carbon black blending step, "Before crosslinking" means before dynamic crosslinking, and "After crosslinking" means after dynamic crosslinking.

Examples 7 to 12

The pellets of the thermoplastic elastomer compositions of Examples 7 to 12 were obtained as in Examples 1 to 6, except that the types and amounts of the crosslinkable elastomer component, thermoplastic resin and crosslinking agent were varied as shown in Table 2 below.

Comparative Examples 7 to 9

The pellets of the thermoplastic elastomer composition of Comparative Example 7 were obtained as in Comparative Example 1, except that the types and amounts of the crosslinkable elastomer component, thermoplastic resin and crosslinking agent were varied as shown in Table 2 below, and the pellets of the thermoplastic elastomer compositions of Comparative Examples 8 and 9 were obtained as in Comparative Examples 2 to 6, except that the types and amounts of the crosslinkable elastomer component, thermoplastic resin and crosslinking agent were varied as shown in Table 2 below.

permeation preventing layer onto the inner surface of tire was prepared. The pressure-sensitive adhesive composition was prepared by dry-blending the components shown in Table 3 below, charging the resulting mixture into a twin-screw kneading extruder (manufactured by The Japan Steel Works, Ltd.), and kneading the mixture at 130° C. for 3 minutes. The resulting mixture was extruded in the form of a strand and cooled with water, and subsequently pelletized with a resin pelletizer to obtain pellets of a pressure-sensitive adhesive composition.

TABLE 2

|  | Ex. 7 | Ex. 8 | Ex. 9 | Ex. 10 | Ex. 11 | Ex. 12 | Comp. Ex. 7 | Comp. Ex. 8 | Comp. Ex. 9 |
|---|---|---|---|---|---|---|---|---|---|
| Starting Materials |  |  |  |  |  |  |  |  |  |
| Elastomer component 2[1] | 100.0 | 100.0 | 100.0 | 100.0 | 100.0 | 100.0 | 100.0 | 100.0 | 100.0 |
| Carbon black (MCF)[2] | 5.0 | 5.0 | 5.0 | 1.0 | 15.0 | 5.0 | 5.0 | 0.5 | 20.0 |
| Thermoplastic resin 3[3] | 41.6 | 41.6 | 41.6 | 41.6 | 41.6 | 41.6 | 41.6 | 41.6 | 41.6 |
| Thermoplastic resin 4[4] | 24.7 | 24.7 | 24.7 | 24.7 | 24.7 | 24.7 | 24.7 | 24.7 | 24.7 |
| Crosslinking agent[5] | 1.0 | 1.0 | 1.0 | 1.0 | 1.0 | 1.0 | 1.0 | 1.0 | 1.0 |
| Carbon black blending step* | Before crosslinking | Before crosslinking | Before crosslinking | Before crosslinking | Before crosslinking | Before crosslinking | After crosslinking | Before crosslinking | Before crosslinking |
| Test Results |  |  |  |  |  |  |  |  |  |
| Accelerated indoor exposure test | Passed | Passed | Passed | Passed | Passed | Passed | Passed | Failed | Passed |
| Tire durability test | Passed | Passed | Passed | Passed | Passed | Passed | Failed | Failed | Failed |

Footnote of Table 2:
[1]Maleic anhydride-modified ethylene-propylene copolymer (Tafmer MP0620 manufactured by Mitsui Chemicals Inc.)
[2]MA600 (MCF grade) (BET nitrogen adsorption specific surface area: 140 m$^2$/g, primary particle average particle diameter: 20 nm) manufactured by Mitsubishi Chemical Co., Ltd.
[3]Nylon 6/66 copolymer (5033B manufactured by Ube Industries, Ltd.)
[4]Ethylene-vinyl alcohol copolymer resin (Soarnol A4412 manufactured by The Nippon Synthetic Chemical Industries Co., Ltd.)
[5]3,3'-Diaminodiphenylsulfone (manufactured by Mitsui Fine Chemicals, Inc.)
*Regarding the carbon black blending step, "Before Crosslinking" means before dynamic crosslinking, and "After Crosslinking" means after dynamic crosslinking.

The properties of the thermoplastic elastomer compositions of Examples 1 to 12 and Comparative Examples 1 to 9 were evaluated by the following test methods.

(1) Accelerated Indoor Exposure Test Method

Each of the pelletized thermoplastic elastomer compositions of Examples 1 to 12 and Comparative Examples 1 to 9 was inflation molded at a temperature of 230° C. using an inflation molding machine (manufactured by Placo Co., Ltd.) to obtain a film having a thickness of 100 μm. The resulting films were punched to obtain specimens having a length of 15 cm and a width of 15 cm. The specimens were subjected to accelerated exposure for 7 days (168 hours) using a sunshine weatherometer (manufactured by Suga Test Instruments Co., Ltd., light source: sunshine carbon arc) set at a temperature of 63° C. and a rainfall time of 12 minutes per 60 minutes. After accelerated exposure, the surfaces of the specimens were visually observed to examine the presence of cracks. The specimens in which cracks were observed were evaluated as "Failed", and the specimens in which no crack was observed were evaluated as "Passed".

(2) Tire Light Resistance Test Method

Tire Production

Firstly, a pressure-sensitive adhesive composition for attaching the thermoplastic elastomer composition as an air

TABLE 3

| Formulation of Pressure-Sensitive Adhesive Composition | |
|---|---|
|  | Amounts (parts by weight) |
| Epoxidized SBS[1] | 100 |
| Zinc oxide[2] | 5 |
| Stearic acid[3] | 1 |
| Vulcanization accelerator[4] | 3 |
| Tackifying Resin[5] | 30 |

Footnote of Table 3:
[1]Epoxidized styrene-butadiene block copolymer (Epofriend AT501 manufactured by Daicel Chemical Industries Ltd.)
[2]Zinc oxide of JIS grade 3 manufactured by Seido Chemical Industry Co., Ltd.
[3]Beads Stearic Acid YR manufactured by Nippon Oil & Fat Co., Ltd.
[4]Nocceler TOT-N manufactured by Ouchi Shinko Chemical Industrial Co., Ltd.
[5]YS Resin D105 manufactured by Yasuhara Chemical Co., Ltd.

The resulting pressure-sensitive adhesive composition in the form of pellets and each of the thermoplastic elastomer compositions of Examples 1 to 12 and Comparative Examples 1 to 9 in the form of pellets were inflation molded at a temperature of 230° C. using an inflation molding machine (manufactured by Placo Co., Ltd.) to obtain a double-layered film consisting of a layer of the pressure-sensitive adhesive and a layer of the thermoplastic elastomer composition. In the resulting double-layered film, the layer of the pressure-sensitive adhesive composition had a thickness of 20 μm, and the layer of the thermoplastic elastomer composition had a thickness of 100 µm. The double-layered film was disposed on a tire molding drum so that the thermoplastic elastomer composition layer is positioned on the drum side. Tire members such as a carcass layer, a belt layer, a tread layer, etc., were laminated on the double-layered film, and the resulting green tire was removed from the tire molding drum. Then, the green tire was vulcanized in a vulcanizer to produce a steel radial tire having a pneumatic tire size of 165SR13 (rim 13×41/2-J).

Evaluations

The tire produced by the procedure described above was horizontally placed on an outdoor ground surface which was sufficiently exposed to sunlight and was left for 12 months, and subsequently the tire was attached to a passenger car and was driven 10,000 km on an actual road at a tire air pressure of 140 kPa and a tire load of 5.5 kN. After driving, the tire was removed from the rim, and the air permeation preventing layer was visually observed, and the tire in which cracks were observed in the air permeation preventing layer or the tire in which the delamination or rising up of the liner layer was observed was determined as "Failed" and the tire in which cracks were not observed in the air permeation preventing layer or the tire in which the delamination or rising up of the liner layer was not observed was determined as "Passed". The results are as shown in Tables 1 and 2 above.

The results in Tables 1 and 2 show that the thermoplastic elastomer composition prepared by using a given amount of the medium color furnace carbon black (MCF) in accordance with the present invention does not readily generate defects such as cracks and has excellent UV degradation resistance.

INDUSTRIAL APPLICABILITY

According to the present invention, a thermoplastic elastomer composition having excellent UV degradation resistance and durability can be obtained, and using this composition as an air permeation preventing layer of a pneumatic tire prevents the tire from degrading when it is exposed to sunlight during storage or during unused conditions, thereby making it possible to improve the durability of the pneumatic tire.

The invention claimed is:

1. A method for producing a thermoplastic elastomer composition having a phase structure comprising a continuous phase comprising at least one thermoplastic resin and a disperse phase comprising dynamically crosslinked elastomer particles finely dispersed in the continuous phase, said method being characterized by dispersing in at least one crosslinkable elastomer component a furnace carbon black having a BET nitrogen adsorption specific surface area of from 100 to 260 $m^2/g$ and a primary particle average particle diameter of from 10 to 25 nm in an amount of 1 to 15 parts by weight with respect to 100 parts by weight of the at least one crosslinkable elastomer component, prior to or during dynamic crosslinking.

2. The method of claim 1, wherein dispersing the furnace carbon black in the at least one crosslinkable elastomer component prior to or during dynamic crosslinking is carried out by:
   (I) kneading the at least one crosslinkable elastomer component and the furnace carbon black to form a premix in which the furnace carbon black is dispersed in the crosslinkable elastomer component, or kneading the at least one crosslinkable elastomer component, the furnace carbon black, and a crosslinking agent to form a premix in which the furnace carbon black and the crosslinking agent are dispersed in the crosslinkable elastomer,
   (II) adding at least one thermoplastic resin to the premix, and
   (III) dynamically crosslinking the crosslinkable elastomer component while kneading the premix and the at least one thermoplastic resin.

3. The method of claim 1, wherein the dynamic crosslinking is carried out by using a twin-screw kneading extruder.

4. The method of claim 3, wherein the twin-screw kneading extruder has at least a kneading zone and a dynamic crosslinking zone which is provided at the downstream side in the extrusion direction with respect to the kneading zone, and wherein at the upstream side with respect to the dynamic crosslinking zone,
   (i) the at least one thermoplastic resin, the at least one crosslinkable elastomer component, the furnace carbon black, and the crosslinking agent, or
   (ii) the premix of the at least one crosslinkable elastomer component, the furnace carbon black, and the crosslinking agent, as well as the at least one thermoplastic resin, are fed to the twin-screw kneading extruder.

5. The method of claim 1, wherein the furnace carbon black is ungranulated.

6. The method of claim 1, wherein the at least one crosslinkable elastomer component is selected from the group consisting of halogenated butyl rubbers, halogenated isobutyrene-paramethylstyrene copolymers, and maleic acid-modified ethylene-alpha-olefin copolymers.

7. The method of claim 1, wherein the at least one thermoplastic resin is selected from the group consisting of polyamide-based resins, poly(vinyl alcohol), and ethylene-vinyl alcohol copolymer.

8. The method of claim 7, wherein the polyamide resin is selected from the group consisting of Nylon 6, Nylon 66, Nylon 46, Nylon 11, Nylon 12, Nylon 6/66 copolymer, and Nylon MXD6.

9. A pneumatic tire comprising an air permeation preventing layer disposed on the inner surface of the tire, wherein the air permeation preventing layer is comprised of the thermoplastic elastomer composition prepared by the method of claim 1.

10. The method of claim 2, wherein the dynamic crosslinking is carried out by using a twin-screw kneading extruder.

11. The method of claim 2, wherein the furnace carbon black is ungranulated.

12. The method of claim 3, wherein the furnace carbon black is ungranulated.

13. The method of claim 4, wherein the furnace carbon black is ungranulated.

14. The method of claim 2, wherein the at least one crosslinkable elastomer component is selected from the group consisting of halogenated butyl rubbers, halogenated isobutyrene-paramethylstyrene copolymers, and maleic acid-modified ethylene-alpha-olefin copolymers.

15. The method of claim 3, wherein the at least one crosslinkable elastomer component is selected from the group consisting of halogenated butyl rubbers, halogenated isobutyrene-paramethylstyrene copolymers, and maleic acid-modified ethylene-alpha-olefin copolymers.

16. The method of claim 4, wherein the at least one crosslinkable elastomer component is selected from the group consisting of halogenated butyl rubbers, halogenated isobutyrene-paramethylstyrene copolymers, and maleic acid-modified ethylene-alpha-olefin copolymers.

17. The method of claim 5, wherein the at least one crosslinkable elastomer component is selected from the group consisting of halogenated butyl rubbers, halogenated isobutyrene-paramethylstyrene copolymers, and maleic acid-modified ethylene-alpha-olefin copolymers.

18. The method of claim 2, wherein the at least one thermoplastic resin is selected from the group consisting of polyamide-based resins, poly(vinyl alcohol), and ethylene-vinyl alcohol copolymer.

19. The method of claim 3, wherein the at least one thermoplastic resin is selected from the group consisting of polyamide-based resins, poly(vinyl alcohol), and ethylene-vinyl alcohol copolymer.

20. The method of claim 4, wherein the at least one thermoplastic resin is selected from the group consisting of polyamide-based resins, poly(vinyl alcohol), and ethylene-vinyl alcohol copolymer.

* * * * *